United States Patent Office 2,980,736
Patented Apr. 18, 1961

2,980,736

PREPARATION OF DICHLOROACETALDEHYDE, CHLORAL AND CHLORAL HYDRATE FROM BETA, BETA'-DICHLORODIETHYL ETHER

Robert M. Thomas, Tonawanda, N.Y., assignor to Olin Mathieson Chemical Corporation, a corporation of Virginia No Drawing. Filed June 2, 1958, Ser. No. 738,963

8 Claims. (Cl. 260—601)

This invention relates to the preparation of dichloroacetaldehyde, chloral and chloral hydrate from beta, beta'-dichlorodiethyl ether.

Chloral hydrate is useful as a starting material in the manufacture of the insecticide DDT (dichlorodiphenyltrichloroethane) and it is usually manufactured by the chlorination of ethanol or by the chlorination of acetaldehyde or paraldehyde in the presence of water. Anhydrous chloral is prepared in a second step from intermediate acetals by distillation over sulfuric acid in the case of the ethanol chlorination or by azeotropic fractionation of the aqueous chloral solution using ethylene dichloride in the case of the acetaldehyde or paraldehyde chlorination.

More recently, another process for the preparation of chloral has been described in U.S. Patent No. 2,680,092 to Churchill and Schaefer. In this process, the beta, beta'-dichlorodiethyl ether is chlorinated in the presence of water and in the presence of light. This process represents an economic advance, since the beta, beta'-dichlorodiethyl ether is produced as an otherwise undesirable by-product in the manufacturing of ethylene chlorohydrin in the glycol process and is available at low cost to operators of this process. However, it is also true that the process of the patent has certain disadvantages. Most serious of these are the low yield of chloral, e.g., 55%, it ultimately affords and its poor light energy and chlorine, e.g., 7%–22%, efficiencies. The low yield is due to the fact that the hydrolysis of alpha, beta, beta'-trichlorodiethyl ether, the first chlorination product, yields only one mole of aldehyde and one mole of a by-product. While it is true that some of the trichlorodiethyl ether is chlorinated to the alpha, alpha', beta, beta' tetrachlorodiethyl ether, which hydrolyses to give 2 moles of aldehyde, the competing hydrolysis reaction prevents sufficient tetrachlorodiethyl ether from being formed to produce a high yield of aldehyde, i.e., chloral, even when exhaustive batch chlorination using a large excess of chlorine is applied.

It has now been found that an improved yield of chloral and a decreased chlorine consumption are achieved in a process which includes a first step of reacting chlorine with beta, beta'-dichlorodiethyl ether in the presence of actinic light under anhydrous conditions to form a product containing alpha, alpha', beta, beta'-tetrachlorodiethyl ether; a second step of reacting chlorine with the product of the first step, and, if desired, additional acetaldehyde, in the presence of water; and, optionally, a third step of exhaustively batch chlorinating the product of the second step. Dichloroacetaldehyde, chloral, i.e., trichloroacetaldehyde, or chloral hydrate are then recoverable from the reaction mixture of the second or optional third step.

According to the invention, anhydrous beta, beta'-dichlorodiethyl ether, i.e., bis-(beta-chloroethyl) ether, is chlorinated in the presence of actinic light to produce a crude alpha, alpha', beta, beta'-tetrachlorodiethyl ether, i.e., bis-(alpha, beta-dichloroethyl) ether as a first step. Bis-(alpha, beta-dichloroethyl) ether, which has the formula $$(CH_2ClCHCl)_2O \qquad (1)$$

is not the only ether yielded by the reaction. It is, however, the most desirable one for the purposes of the invention. Among the other ethers formed in the reaction, in which an HCl splits off for each chlorine atom addition on the starting ether, are the following:

$$\begin{array}{c} CH_2ClCHCl \\ \diagdown \\ O \\ \diagup \\ CH_2ClCH_2 \end{array} \qquad (2)$$

$$\begin{array}{c} CHCl_2CHCl \\ \diagdown \\ O \\ \diagup \\ CH_2ClCHCl \end{array} \qquad (3)$$

$$\begin{array}{c} CH_2ClCCl_2 \\ \diagdown \\ O \\ \diagup \\ CH_2ClCHCl \end{array} \qquad (4)$$

$$(CHCl_2CHCl)_2O \qquad (5)$$

The reason for bis-(alpha, beta-dichloroethyl) ether (1) being the preferred product of the first step of the process of the invention is that it is the ether best adapted for use in the second step of the process.

A broad range of process conditions is available for the first step of the process. However, a molar ratio of 1.4 to 2.8 moles of chlorine to each mole of starting bis-(beta-chloroethyl) ether is preferred, since it affords upwards of 80 weight percent yields of the desired bis-(alpha, beta-dichloroethyl) ether (1). A lower ratio affords poor yields of the desired ether and, when the ratio is increased above 3/1, significant quantities of hexachloro-, heptachloro- and still higher chlorine-substituted ethers are produced.

Further, a temperature of from room temperature, i.e., 20° C., to about 100° C. can be employed in the first step of the process of the present invention. Any temperature in this range is suitable, since the reaction tends to proceed very rapidly when sufficient actinic light is employed. However, it is preferable not to go much above 100° C., since the starting bis-(beta-chloroethyl) ether tends to add chlorine at the beta positions, rather than at the desired alpha positions, at higher temperatures.

The second step of the process can also be carried on under a wide range of process conditions. In its preferred embodiments, it involves a continuous, rather than a batch chlorination. In such operation, the proportions of substances fed into the reaction zone depend, of course, on the constitution of the intermediate reaction product coming from the first step of the process. Generally, however, the molar ratio of water to intermediate reaction product should be in the range of 2:1 to 4:1 and the molar ratio of chlorine to intermediate reaction product should be in the range of 2.9:1 to 6:1. When, on the other hand, the intermediate reaction product contains up to 80 weight percent or more of bis-(alpha, beta-dichloroethyl) ether (1), the preferred molar ratios are as follows:

$$\frac{\text{Water}}{\text{Crude ether (1)}} = \frac{2.5 \text{ to } 3.5}{1}$$

and $$\frac{\text{Chlorine}}{\text{Crude ether (1)}} = \frac{3.8 \text{ to } 5.8}{1}$$

The preferred residence time within the reaction zone of the second step is 40 to 60 hours and the product therefrom is continuously or intermittently withdrawn at a rate equal to the charging rate of the reactants in order to maintain a steady state within the reactor. The effluent can be fractionated to recover chloral hydrate which can be dehydrated by known means, such as azeotropic fractionation using ethylene dichloride or by dehydration with sulfuric acid. Such dichloroacetaldehyde as is obtained in the fractionation of the effluent can be recycled to the hydrolysis step.

The optional third step in the process of the invention involves an exhaustive batch chlorination of the reaction mixture of the second step of the process. In this step, which has as its main reaction the chlorination of dichloroacetaldehyde to trichloroacetaldehyde, i.e., chloral, the reaction mixture from the second step is heated, batchwise, to about 80° C. to 90° C. while chlorine is passed into it for several hours. This final batch chlorination improves the chloral yield of the process as a whole and simplifies the chloral recovery. Those skilled in the art can readily determine the reaction time necessary per batch by analysis of the reaction mixture taken from the second step.

The process of this invention is further illustrated by the following examples.

Example I

Chlorination of technical bis-(beta-chloroethyl) ether, i.e., anhydrous beta, beta'-dichlorodiethyl ether obtained as a by-product in the manufacture of ethylene chlorohydrin by the glycol process, was carried out by circulating it through a jacketed pyrex reactor by means of a centrifugal pump. After reaction, the stream returned to a reservoir for recirculation. Gaseous chlorine was metered into the liquid feed through a mixing device located between the pump and the reactor. Ultraviolet light was directed into the reactor. The reaction was maintained at a temperature of from 35° C. to 60° C. by means of water flowing through its jacketing.

Chlorine absorption was quantitative and rapid. The chlorination time was limited only by the capacity of the equipment to cool the reaction mixture. The chlorination was continued until approximately 2.1 moles of chlorine per mole of bis-(beta-chloroethyl) ether had reacted. The resulting product of the first step of the process contained approximately 77 mole percent bis-(alpha, beta-dichloroethyl) ether (1), 15 mole percent trichlorodiethyl ether (2) and 8 mole percent pentachlorodiethyl ethers (3) and (4) and was used without further treatment in the second step of the process.

The second step was carried out in a kettle provided with a stirrer which already contained a chloral mixture (from a previous chlorination) of 74 weight percent chloral, 12 weight percent dichloroacetaldehyde, water and some minor impurities.

The product of the first step was fed continuously to the stirred kettle and chlorine was fed simultaneously to the kettle through a sparger tube at a ratio of 3.4 moles per mole of bis-(alpha, beta-dichloroethyl) ether (1). The theoretical amount of water to hydrolyze the ether to the chloroacetaldehyde and to permit the formation of the hydrate of the chloral was added continuously. The addition rates were adjusted so that the average residence time of the reactants in the kettle was 55 hours, during which time the temperature was maintained at 85° C.

As noted, the reaction of the second step is carried out under conditions suited to the production of chloral hydrate. However, in analyzing the reaction product of the second step, a method, i.e., the stoichiometric reaction of a sample of the product of the second step with aqueous sodium hydroxide to yield chloroform and sodium formate, is employed which is equally operative whether such reaction product is entirely chloral, entirely chloral hydrate or a mixture of both and which measures the effectiveness of the two step process of the invention in terms of the chloral it yields.

Thus, the reaction product of the second step after equilibrium conditions were reached was analyzed by converting the chloral to chloroform with aqueous sodium hydroxide and measuring the amount of chloroform. The analysis showed the reaction mixture to contain 73 percent by weight chloral and 10 percent by weight dichloroacetaldehyde which, since it can be almost completely converted to chloral, is considered as part of the chloral yield. Thus, a material balance over an operating period of 64 hours showed that the conversion of crude bis-(alpha, beta-dichloroethyl) ether (1) to chloral and dichloroacetaldehyde was 82 weight percent, based on the amount of technical bis-(beta-chloroethyl) ether charged to the photochemical, anhydrous chlorination of the first step of the process.

Pure chloral was readily recovered from the reaction mixture by azeotropic fractionation using ethylene dichloride as the azeotroping agent. The dichloroacetaldehyde was suitable for use as an intermediate in other synthesis or for return to the chlorinator for conversion into more chloral.

By contrast, when acetaldehyde alone was used as feed to the continuous reactor described above and all other conditions were kept comparable, it was converted to chloral and dichloroacetaldehyde in yields of 67 weight percent and 9 weight percent, respectively. Again, attempts to use bis-(beta-chloroethyl) ether directly in the proposed process were unsuccessful. When the bis-(beta-chloroethyl) ether was used alone as feed to the reactor, only a 17 percent by weight yield of chloral was obtained after an 83 weight percent conversion of the ether.

Example II

A solution was prepared from equal weights of acetaldehyde and of a mixture containing 64 mole percent bis-(alpha, beta-dichloroethyl) ether (1) 10 mole percent trichlorodiethyl ether and 26 mole percent pentachlorodiethyl ether (3) and (4). This solution, together with chlorine, was added continuously to a stirred reactor containing crude chloral from a previous chlorination. The chlorine was added in a ratio of 2.9 moles per mole of acetaldehyde-crude bis-(alpha, beta-dichloroethyl) ether. Water in an amount equivalent to 90 percent of the theoretical quantity required to form the hydrate was added simultaneously with the other reactants. The average residence time in the reactor was 55 hours during which time the temperature was maintained by cooling at 85° C.

After equilibrium conditions were established, analysis of the product from the reactor showed that 95 weight percent of the organic feed had been converted to a mixture of chloral and dichloroacetaldehyde. Subsequent batch chlorination was used to convert the dichloroacetaldehyde to chloral in a final overall yield of 93 weight percent. This batch chlorination product contained, before purification, 82 percent by weight chloral and 5 percent by weight dichloroacetaldehyde.

Example III

A mixture of 79 moles of acetaldehyde per 21 moles of bis-(beta-chloroethyl) ether was fed continuously into a stirred reactor containing crude chloral. Simultaneously, 3.3 moles of chlorine and 1.2 moles of water per mole of organic feed were added to the reaction mixture. The product was removed from the reactor at a rate to give an average residence time of 55 hours. The temperature was maintained at 85° C. by cooling. Analysis by the chloroform method indicated that 69 weight percent of the bis-(beta-chloroethyl) ether was unreacted and that the yield of chloral and dichloroacetaldehyde was only 64 weight percent. Thus, even under the most favorable conditions, a feed mixture of acetaldehyde and bis-(beta-chloroethyl) ether—rather than the bis-(alpha, beta-dichloroethyl) ether (1) employed in Example II, supra—does not yield chloral in high amounts.

Example IV

The advantage of using crude bis-(alpha, beta-dichloroethyl) ether containing about 50 mole percent or more of the former is shown by the following describing the results of a series of batchwise chlorinations.

| Run No. | A | B | C |
|---|---|---|---|
| Feed Comp., mole percent: | | | |
| Trichloro- | 90 | 10 | ------ |
| Tetrachloro- | 5 | 80 | 14 |
| Pentachloro- | ------ | 9 | 61 |
| Hexachloro- | ------ | ------ | 25 |
| Mole ratio of chlorine to ether | 1 | 1.9 | 3.1 |
| Yield, mole percent: Chloral+$CHCl_2CHO$ | 59 | 79 | 61 |

The substantially lower yield using bis-(beta-chloroethyl) ether chlorinated with a high ratio of chlorine to ether is due to the presence of the hexachlorodiethyl ether content.

Example V

That appreciable amounts of pentachlorodiethyl ether can be tolerated in the crude bis-(alpha, beta-dichloroethyl) ether is shown by comparing the results of the following continuous chlorinations.

| Run No. | A | B |
|---|---|---|
| Feed, Comp., mole percent: | | |
| Trichloro- | 15 | ------ |
| Tetrachloro- | 77 | 39 |
| Pentachloro- | 8 | 54 |
| Hexachloro- | ------ | 7 |
| Mole ratio of chlorine to ether | 2.0 | 2.7 |
| Yield, mole percent: Chloral+$CHCl_2CHO$ | 82 | 77 |

What is claimed is:

1. A method of producing at least one of the materials selected from the group consisting of dichloroacetaldehyde, chloral and chloral hydrate which comprises reacting beta, beta'-dichlorodiethyl ether with chlorine in a molar ratio within the range from about 1:1 to 1:3 and at a temperature of from 20° C. to 100° C. in the presence of actinic light under anhydrous conditions to produce an intermediate reaction product containing at least about 39 mole percent of alpha, alpha', beta, beta'-tetrachlorodiethyl ether and reacting the intermediate reaction product with chlorine in a molar ratio of 1:2.9 to 1:6 and with water in a molar ratio of 1:2 to 1:4 and at a temperature of from 75° C. to 90° C.

2. The method of claim 1 in which the intermediate reaction product contains at least about 50 mole percent of alpha, alpha', beta, beta'-tetrachlorodiethyl ether.

3. The method of claim 1 in which the product of reaction of the intermediate reaction product with chlorine and water is further reacted with chlorine at a temperature of about 80° to 90° C.

4. A method of producing at least one of the materials selected from the group consisting of of dichloroacetaldehyde, chloral and chloral hydrate which comprises reacting beta, beta'-dichlorodiethyl ether with chlorine in a molar ratio of from about 1:1.4 to 1:2.8 and at a temperature of from 20° C. to 100° C. in the presence of actinic light under anhydrous conditions to produce an intermediate reaction product containing at least about 39 mole percent of alpha, alpha', beta, beta'-tetrachlorodiethyl ether and a second step of reacting the intermediate reaction product with chlorine in a molar ratio of 1:3.8 to 1:5.8 and with water in a molar ratio of 1:2.5 to 1:3.5 and at a temperature of from 75° C. to 90° C.

5. The method of producing at least one of the materials selected from the group consisting of dichloroacetaldehyde, chloral and chloral hydrate which comprises reacting crude alpha, alpha', beta, beta'-tetrachlorodiethyl ether, containing at least about 39 mole percent of said ether, with chlorine in a molar ratio of 1:2.9 to 1:6 and with water in a molar ratio of 1:2 to 1:4 and at a temperature of from 75° C. to 90° C.

6. The method of claim 5 in which the crude ether contains at least about 50 mole percent of said ether.

7. The method of claim 5 in which the product of reaction of the crude ether with chlorine and water is further reacted with chlorine at a temperature of about 80 to 90° C.

8. The method of producing at least one of the materials selected from the group consisting of dichloroacetaldehyde, chloral and chloral hydrate which comprises reacting crude alpha, alpha', beta, beta'-tetrachlorodiethyl ether, containing at least about 39 mole percent of said ether, with chlorine in a molar ratio of 1:3.8 to 1:5.8 and with water in a molar ratio of 1:2.5 to 1:3.5 and at a temperature of 75° C. to 90° C.

References Cited in the file of this patent

UNITED STATES PATENTS

| | | |
|---|---|---|
| 2,680,092 | Churchill et al. | June 1, 1954 |
| 2,697,119 | Gilbert et al. | Dec. 14, 1954 |